United States Patent [19]

Burba et al.

[11] Patent Number: 4,525,571

[45] Date of Patent: Jun. 25, 1985

[54] EPOXY RESIN/CYCLOALIPHATIC AMINE CURING AGENT MIXTURES

[75] Inventors: Christian Burba, Ascheberg-Herbern; Herbert Franz, Hamm, both of Fed. Rep. of Germany

[73] Assignee: Schering AG, Berlin and Bergkamen, Fed. Rep. of Germany

[21] Appl. No.: 625,044

[22] Filed: Jun. 27, 1984

[30] Foreign Application Priority Data

Jul. 9, 1983 [DE] Fed. Rep. of Germany ....... 3324873

[51] Int. Cl.$^3$ .............................................. C08G 59/50
[52] U.S. Cl. .................................... 528/111; 525/504; 528/103; 528/122; 528/407
[58] Field of Search ............... 528/103, 111, 407, 122; 525/504

[56] References Cited

U.S. PATENT DOCUMENTS 4,070,400 1/1978 Dybas et al. ................. 260/570.5 P
4,330,660 5/1982 Kluger et al. ........................ 528/111
4,429,158 1/1984 Good et al. ..................... 528/111 X

FOREIGN PATENT DOCUMENTS 2100718 1/1983 United Kingdom .
1131543 10/1983 United Kingdom .

OTHER PUBLICATIONS

Patent Abstracts of Japan, vol. 4, No. 42, (C-5) (524), Apr. 3, 1980, (JP-55-13754).

Primary Examiner—Earl A. Nielsen
Attorney, Agent, or Firm—Curtis, Morris & Safford

[57] ABSTRACT

Curable synthetic resin mixtures, useful as surface coatings, are prepared by the reaction of solid or liquid epoxy resins with curing agents in turn prepared by the reaction of epichlorohydrin with a cycloaliphatic diprimary diamine in a molor ratio between 1:>1 to 1:2.

6 Claims, No Drawings

EPOXY RESIN/CYCLOALIPHATIC AMINE CURING AGENT MIXTURES

The invention relates to a method for making hardenable synthetic resin mixtures useful as surface coatings such as varnishes. More in particular, the invention relates to curable synthetic resin mixtures of epoxy resins and polyamines, wherein the polyamines are reaction products of epichlorohydrin and a cycloaliphatic and/or cycloaliphatic/aliphatic diprimary amine.

Surface coatings comprising epoxy resins and amine curing agents are known to have good chemical and physical properties.

However, in air curing, and particularly at low temperatures and/or with high humidity, such mixtures will not cure satisfactorily. This manifests itself in surfaces which remain tacky, clouded, or dull or which exhibit structural defects such as an orange peel effect. To reduce sensitivity to moisture, adducts of epoxy resin with amines have been used as curing agents in place of low molecular weight amines. To produce these adducts, the epoxy resin is reacted with an excess of a low molecular weight polyamine so that an amine molecule adds to each epoxy group. The compounds so formed contain one OH group for every reacted epoxy group.

While these adducts, to be sure, possess lower sensitivity to moisture, they also have the drawback of considerably increased viscosity. That is to say some of them are solids, which makes them difficult to use especially in fields where no solvent is employed.

Defects in surface structure in particular cannot be reliably suppressed with such adducts under the changing curing conditions encountered in practice.

The reaction products of epichlorohydrin with an excess of an araliphatic amine represent an improvement in this respect. However, they do not meet all practical requirements, particularly in the case of solventless systems.

The object of the invention is to provide a method for making curable synthetic resin compositions useful as surface coatings, and particularly as varnishes and other coatings, and having a viscosity that meets practical requirements even when solvent free, and which method overcomes the drawbacks of the prior art and makes possible the production of surface coatings of a flawless structure and high gloss.

In accordance with the invention, this object is accomplished by a method for making curable synthetic resin mixtures by the reaction of (1) a solid or liquid polyglycidyl ether having an epoxy value from 0.1 to 0.6, optionally with the concurrent use of reactive low viscosity diluents, with (2) a polyamine which on the average has more than two reactive amine hydrogen atoms, optionally with the concurrent use of conventionally employed curing agents, solvents, and additives, wherein component (2) is the reaction product of epichlorohydrin and a cycloaliphatic diprimary diamine in a molar ratio between 1:>1 and 1:2.

The epoxy resins which are used according to the invention are glycidyl ethers having more than one epoxy group per molecule and which are derived from polyhydric phenols, particularly from bisphenols and novolacs, and which have epoxy values ranging from 0.1 to 0.6, and more particularly from 0.2 to 0.55. In accordance with the invention, liquid diglycidyl ethers comprising bisphenol A and having an epoxy value between 0.5 and 0.55 are preferred.

An extensive recitation of these di- or polyphenols is found in Chapter IV of the manual *Epoxidverbindungen und Epoxidharze* ("Epoxy Compounds and Epoxy Resins"), by A. M. Paquin, Springer Verlag, Berlin, 1958, and in Chapter 2 of the *Handbook of Epoxy Resins,* by Lee and Neville, 1967. Blends of two or more epoxy resins may also be used. In accordance with the invention, liquid diglycidyl ethers comprising bisphenol A and having an epoxy value from 0.4 to 0.55 are preferred.

If necessary, known reactive diluents such as ethylhexyl glycidyl ethers, butyl glycidyl ethers, long chain aliphatic glycidyl ethers, monoglycidyl ethers of a higher isomeric alcohol mixture, 1,6-hexanediol diglycidyl ethers, cresyl glycidyl ethers, neopentyl glycol diglycidyl ethers, and para-tert-butylphenyl glycidyl ethers may be used for modification in amounts of up to 30 percent, and preferably from 10 to 15 percent, by weight of the polyglycidyl ethers.

Examples of cycloaliphatic diprimary diamines used in accordance with the invention are 1,3-diaminocyclohexane, 1,4-diaminocyclohexane, 1,2-diamino-4-ethylcyclohexane, 1,4-diamine-3,6-diethylcyclohexane, 1-cyclohexyl-3,4-diaminocyclohexane, and preferably 1,2-diaminocyclohexane.

These amines are reacted in excess (based on the reactive groups) with epichlorohydrin to give the corresponding hydroxy amines. The molar ratio of epichlorohydrin to diamine should be between 1:>1 and 1:2, suitably between 1:1.1 and 1:2 and preferably between 1:1.5 and 1:2.

The reaction products may be used alone or in admixture. Alternatively, in their preparation one or more of the diamines listed may be reacted with epichlorohydrin in the amounts indicated.

When the reaction products used in accordance with the invention are employed alone as curing agents, the cured film can be expected to have no structural surface defects and also will exhibit high gloss.

Because of the outstanding effectiveness of the reaction products used in accordance with the invention, the amine compounds mentioned above may also be used therewith as curing agents in the form of free amine compounds, i.e. without being reacted with epichlorohydrin. Commonly employed amine curing agents for epoxy resins may also be used in this way. Depending on the nature of the curing agents of the invention and the commercial curing agents used, their amounts may be varied over a relatively wide range and are readily determined by trial and error. Visible improvements with regard to surface structure and gloss are usually obtained even with an amount of a reaction product in accordance with the invention of only about 20 percent, by weight of the total amount of curing agent.

When the reaction products are used in admixture with commercial amine curing agents for epoxy resins rather than alone, it is possible, moreover, to increase or decrease the molar ratio of epichlorohydrin to diamine beyond the range of 1:>1 to 1:2. Higher molecular weight compounds or mixtures of the reaction products and free amines are then obtained. While higher molecular weight compounds are less preferred in accordance with the invention since their viscosity is markedly higher, in admixture with low viscosity components or with solvents they too have properties which improve structure and gloss.

If desired, the reaction products of epichlorohydrin and the mentioned diamines used in accordance with the invention may also be modified in a manner customary in the epoxy resin/curing agent field. That is, they may be conventionally reacted to give phenolformaldehyde condensation products or used to form adducts with less than stoichiometric amounts of epoxy resins and unsaturated compounds such as acrylonitrile, acrylic acid, or acrylic acid esters.

Preferred among such reaction products are those prepared by the condensation of a natural or synthetic monomeric fatty acid having from 12 to 22 carbon atoms, and more particularly 18 carbon atoms, as well as the products of their dimerization and polymerization, with an excess of a reaction product of 1,2-diaminocyclohexane with epichlorohydrin. These polyaminoamides have amine values ranging from about 200 to 600, and more particularly from 300 to 500.

In the method of the invention, the glycidyl ethers and the curing agents are preferably used in approximately equivalent amounts, based on epoxy groups and reactive amine hydrogen atoms. However, one of the components may also be used in an excess or deficiency of from about 5 to 10 percent if it is desired to modify the cured coating to obtain particular properties in the end product.

Moreover, commonly employed modifiers may be used to obtain an optimum surface coating. These include fillers such as quartz powder, silicates, chalk, gypsum, barite, titanium dioxide, carbon black, metal powders, and organic or inorganic fibers; plasticizers such as phthalic esters, benzyl alcohol, and phosphites; and solvents such as toluene, xylene, diacetone alcohol, ketones, and ethyl glycol monoethers. Other additives are colorants, flow control agents, thixotropic agents, and flame retardants.

For modification of the gel and cure times, monomeric polyphenols, salicylic acid, benzoic acid, tertiary amines such as dimethylaminobenzylamine, 1,3,5-tris(-di-methylaminomethyl)phenol (DMP 30), and other accelerators commonly employed in this field may be used.

The process of the invention can be used to coat both absorbent and nonabsorbent organic or inorganic substrates such as wood, rubber, leather, textiles, metals, concrete, etc.

A better understanding of the present invention and of its many advantages will be had by referring to the following specific examples, given by way of illustration.

EXAMPLE 1

456 g (4 moles) of 1,2-diaminocyclohexane and 500 ml of ethanol were heated to 65° C. in a heatable reaction vessel. 185 g (2 moles) of epichlorohydrin were gradually added dropwise to this solution with steady stirring. On completion of this addition, the reaction was continued for 2 hours at 65° C. and for 30 minutes with reflux. After cooling to room temperature, 80 g (2 moles) of solid sodium hydroxide were added in portions and the batch was stirred for 4 hours at 40° to 50° C. The sodium chloride formed was filtered off and the ethanol was distilled off, ultimately at 100° C. and 70 millibars.

The reaction product had the following analytical values:
Amine number: 750 mg KOH/g
Viscosity at 25° C.: 4.0 Pa.sec
Chlorine (weight percent): 0.2

The reaction products of Example 2 and of Comparison Example 3 were prepared by the same procedure.

TABLE 1

|  | Amine | Moles | Moles ECH | Amine number (mg KOG/g) | Viscosity at 25° C. (Pa.sec) |
|---|---|---|---|---|---|
| Example |  |  |  |  |  |
| 1 | DCH | 2 | 1 | 750 | 4.0 |
| 2 | DCH | 1.5 | 1 | 705 | 7.0 |
| Comparison Example |  |  |  |  |  |
| 3 | EDA | 2 | 1 | 1,010 | highly viscous |

Key
ECH = epichlorohydrin
DCH = 1,2-diaminocyclohexane
EDA = ethylenediamine

For the production of hardenable mixtures for surface coating, epoxy resin and curing agent were mixed in the amounts specified in following Table 2 and homogenized. This curable mixture was applied to a glass plate, spread with a knife coater to form a layer with a uniform thickness of 0.2 mm, and cured under the conditions indicated.

TABLE 2

|  | Reaction product from Table 1 | | Epoxy resin | | Surface condition when cured under the following conditions: | |
|---|---|---|---|---|---|---|
| Example | Example | g[1] | Type | g | 24 hr. at 10° C. Humidity 90% | 3 hr. at 10° C./humidity 90% 24 hr. at 23° C./humidity 60% |
| 1 | 1 | 50 | "EUREPOX 710[2]" | 100 | High gloss | High gloss |
| 2 | 2 | 55 | " | 100 | High gloss | High gloss |
| 3 | 1 | 50 | ([3]) | 167 | High gloss | Gloss = 100, flawless |
| 4 | 2 | 55 | ([3]) | 167 | High gloss | Gloss = 97, flawles |
| 5 | 3 | 30.8 | ([3]) | 167 | Turbid; pronounced structure | Slightly turbid, structure |

[1] 50% solution in benzyl alcohol
[2] "EUREPOX 710", trademark of Schering AG; epoxy resin comprising bisphenol A; epoxy value = 0.52
[3] Pigment paste of 3000 g of epoxy resin (epoxy value, 0.52) consisting of 88% bisphenol A resin and 12% para-tert-butylphenyl glycidyl ether, 270 g red pigment PEG 356, and 1740 g of a naturally occurring Al/K/Mg silicate
[4] Degree of gloss measured with a reflector meter at 60°

What is claimed is:
1. A method for making a curable synthetic resin composition suitable for the production of surface coatings, which method comprises reacting
    (1) a solid or liquid polyglycidyl ether having an epoxy value from 0.1 to 0.6 with

(2) a polyamine which is the reaction product of epichlorohydrin and a cycloaliphatic diprimary diamine and which has an average of more than two reactive amino hydrogen atoms per molecule, said polyglycidyl ether and polyamine being reacted in a molar ratio between 1:>1 and 1:2.

2. A method as in claim 1 wherein said cycloaliphatic diamine is 1,2-diaminocyclohexane.

3. A method as in claim 1 wherein said polyglycidyl ether is a liquid diglycidyl ether comprising bisphenol A having an epoxy value from 0.4 to 0.55.

4. A method as in claim 1 wherein said epichlorohydrin and said cycloaliphatic diprimary diamine are reacted in a molar ratio between b 1:1.5 and 1:2.

5. A method for coating a surface which comprises applying to said surface a curable synthetic resin mixture as in claim 1 and curing said mixture.

6. A surface coating prepared by the method of claim 5.

* * * * *